(12) United States Patent
Mosko et al.

(10) Patent No.: US 10,257,092 B2
(45) Date of Patent: *Apr. 9, 2019

(54) CCN ROUTING USING HARDWARE-ASSISTED HASH TABLES

(71) Applicant: CISCO TECHNOLOGY, INC., San Jose, CA (US)

(72) Inventors: Marc E. Mosko, Santa Cruz, CA (US); Ignacio Solis, South San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/451,015

(22) Filed: Mar. 6, 2017

(65) Prior Publication Data

US 2017/0180252 A1 Jun. 22, 2017

Related U.S. Application Data

(63) Continuation of application No. 14/570,144, filed on Dec. 15, 2014, now Pat. No. 9,590,948.

(51) Int. Cl.
| | |
|---|---|
| *H04L 12/745* | (2013.01) |
| *H04L 29/12* | (2006.01) |
| *H04L 29/08* | (2006.01) |
| *H04L 12/743* | (2013.01) |

(52) U.S. Cl.
CPC ........ *H04L 45/748* (2013.01); *H04L 45/7453* (2013.01); *H04L 61/1552* (2013.01); *H04L 61/303* (2013.01); *H04L 61/3005* (2013.01); *H04L 67/327* (2013.01); *H04L 69/329* (2013.01)

(58) Field of Classification Search
CPC .............. H04L 45/7453; H04L 45/748; H04L 61/1552; H04L 61/3005; H04L 61/303; H04L 67/327; H04L 69/329
USPC ...................................................... 370/392
See application file for complete search history.

(56) References Cited

U.S. PATENT DOCUMENTS 9,590,948 B2 * 3/2017 Mosko ............... H04L 61/3005

* cited by examiner

*Primary Examiner* — Mark H Rinehart
*Assistant Examiner* — Kokou R Detse

(57) ABSTRACT

One embodiment provides a system that facilitates forwarding of packets with variable length names. During operation, the system receives a packet with a hierarchically structured variable length identifier (HSVLI) which comprises contiguous name components ordered from a most general level to a most specific level. The system performs a longest prefix match lookup by selecting an entry from a first data structure of entries. The entries indicate a name component, forwarding information for the name component, and a plurality of entry identifiers that chain an entry to another entry. If a size of the name component is less than or equal to a predetermined threshold, the system selects an entry based on the name component. If the size is greater, the system selects an entry based on a compressed key which can be a hash of the name component. The system also resolves collisions associated with the selected entry.

20 Claims, 8 Drawing Sheets

CCN ROUTING USING HARDWARE-ASSISTED HASH TABLES

PRIORITY DATA

This Application is a continuation application (and claims the benefit of priority under 35 U.S.C. § 120) of U.S. application Ser. No. 14/570,144 entitled "CCN ROUTING USING HARDWARE-ASSISTED HASH TABLES," filed on Dec. 12, 2014, Inventors Marc E. Mosko et al. The disclosure of this prior application is considered part of the disclosure of this application and is incorporated by reference.

RELATED APPLICATIONS

The subject matter of this application is related to the subject matter in the following applications:

- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"), and
- U.S. Pat. No. 8,243,735 (U.S. patent application Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, issued 14 Aug. 2012 (hereinafter "U.S. Pat. No. 8,243,735"); the disclosures of which are herein incorporated by reference in their entirety.

BACKGROUND

Field

This disclosure is generally related to distribution of digital content. More specifically, this disclosure is related to forwarding packets in a content centric network (CCN) by using hardware-assisted hash tables in a CCN router.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level, and can contain an arbitrary number of path segments (e.g., name components) of unbounded and variable length.

In general, a CCN router maintains a forwarding table to determine how to forward a packet. The forwarding table can be a hash table where the key is based on a name component and the result contains the forwarding information for the name component. Network processors in a CCN router can increase the efficiency and speed of forwarding by providing hardware-assisted hash tables. These hardware-assisted hash tables typically restrict the key length and the result length to a fixed size. This restriction imposes limits on using these hardware-assisted hash tables for forwarding packets in a CCN, where forwarding is performed based on name components of unbounded and variable length which may be greater than the fixed length supported by the hardware-assisted hash tables.

SUMMARY

One embodiment provides a system that facilitates forwarding of packets with variable length names. During operation, the system receives a packet with a hierarchically structured variable length identifier (HSVLI) which comprises contiguous name components ordered from a most general level to a most specific level. The system performs a longest prefix match lookup by selecting an entry from a first data structure of entries. The entries indicate a name component, forwarding information for the name component, and a plurality of entry identifiers that chain an entry to another entry. Each name component has a size. If the size of a name component is less than or equal to a predetermined threshold, the system selects an entry based on the name component. If the size is greater, the system compresses the name component to obtain a compressed key, and selects an entry based on the compressed key. In response to determining a lookup collision associated with the selected entry, the system resolves the lookup collision, thereby facilitating forwarding of packets with variable length names.

In some embodiments, in response to determining that the size of the name component is less than or equal to the predetermined threshold, the system creates an entry in the first data structure based on the name component. In response to determining that the size of the name component is greater than the predetermined threshold, the system performs a first compression function on the name component to obtain a compressed key and creates an entry in the first data structure based on the compressed key. In response to determining an insertion collision based on the created entry, the system resolves the insertion collision.

In some embodiments, the system creates an entry in a second data structure based on the name component, wherein the second data structure indicates the name component and a corresponding index. The system sets a string identifier field in the entry for the name component in the first data structure to the index from the second data structure.

In some embodiments, the system resolves the insertion collision by including a collision indicator in the created entry in the first data structure. The system performs a second compression function on the name component to obtain a new lookup key. The system also creates an entry in a third data structure based on the new lookup key, wherein the third data structure indicates the new lookup key and forwarding information for the name component.

In some embodiments, the system resolves the lookup collision by determining that the selected entry includes the collision indicator. The system performs the second compression function on the name component to obtain the new lookup key, and selects an entry in the third data structure based on the new lookup key.

In some embodiments, in response to selecting the entry in the first data structure based on the compressed key, the system determines the index of the string identifier field for the selected entry and retrieves, from the second data structure, the name component based on the determined index. The system compares the name component of the HSVLI with the retrieved name component from the second data structure.

In some embodiments, the plurality of entry identifiers includes a parent identifier and an entry identifier, wherein the entry identifier is unique for each entry in the first data structure. For each name component, beginning with a component at the most general level, the system selects the entry based on the parent identifier, wherein: for the most general level name component, the parent identifier of the entry corresponds to a predetermined initial value; and for each subsequent name component, the parent identifier of the entry corresponds to the entry identifier of an entry corresponding to the name component of a previous most general level.

In some embodiments, the first data structure is a hash table of entries comprised of a key and a result, wherein: if the size is less than or equal to the predetermined threshold, the key is based on the name component directly; and if the size is greater than the predetermined threshold, the key is based on the compressed key.

DETAILED DESCRIPTION

Figure 1:
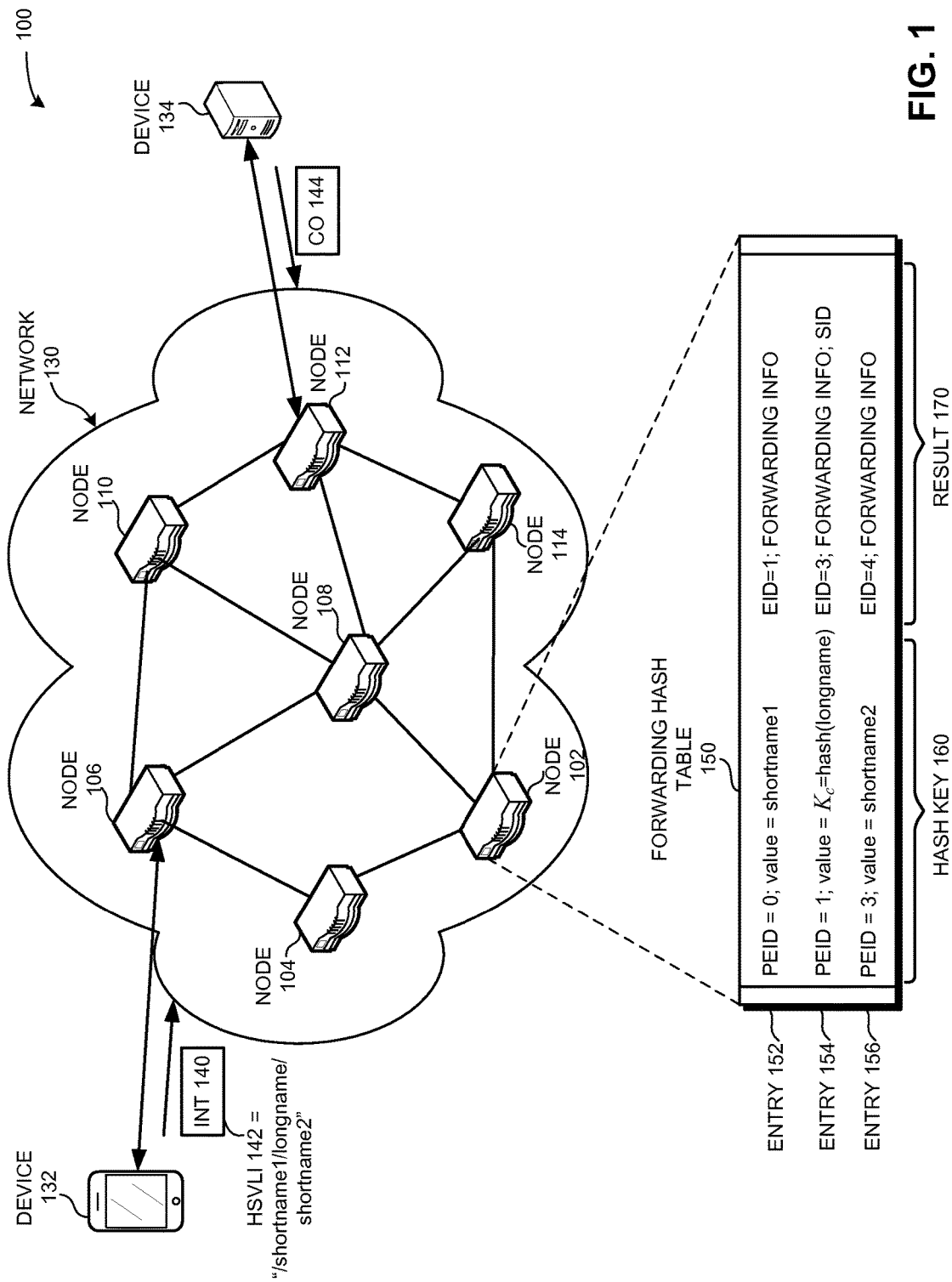
FIG. 1 illustrates an exemplary computing environment that facilitates forwarding of packets with variable length names using hardware-assisted hash tables, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that solves the problem of using hardware-assisted hash tables (which are typically restricted to fixed length keys) to forward CCN packets by mapping name components to a forwarding hash table and performing chained hash lookups in the forwarding hash table. Forwarding a CCN packet is typically based on a name associated with the packet, which can be a hierarchically structured variable length identifier (HSVLI) that includes contiguous name components ordered from a most general level to a most specific level. The present system can map the name components of an HSVLI for insertion and lookup in the forwarding hash table of a CCN router based on the size of each name component. When the size of the name component is small (e.g., less than or equal to 41 bytes), the system creates a hash table entry using a standard hash table function, where the key is the name component. When the size is big (e.g., greater than 41 bytes), the system creates the entry by first applying a compression function on the name component, and using the compressed value as the key for the hash table. The system can also insert the uncompressed name component into a separate string table at a specific index, and indicate that index in the result of the entry. If a collision occurs during insertion, the system can set a flag in the result to indicate a collision, generate a new lookup key, and create an entry in a separate table using the new lookup key.

Furthermore, the system uses the forwarding hash table to perform chained hash lookups, which determines the forwarding information for a packet. During the insertion process, the system assigns a unique index key (e.g., an entry identifier (EID)) to each result in the forwarding hash table. Each entry includes its own unique index key and also includes a pointer to the unique index key of the previous name component (e.g., a parent entry identifier (PEID)). Another method of using the forwarding hash table in a CCN router is cumulative name component hashing, described in U.S. Pat. No. 8,243,735, herein incorporated by reference.

To forward the packet, the system parses through each name component of an HSVLI, from the most general level to the most specific level, using the unique index keys of each entry result to chain the lookups in the forwarding hash table for each name component. Similar to the insertion process, the system looks up a name component by using the name directly if the size is less than or equal to a certain size, and by using the compressed key if the size is greater. If a collision occurs during lookup, the system can use the index included in the result of the entry to obtain the original uncompressed key from the separate string table, and compare the uncompressed key with the name component of the HSVLI from the packet. Furthermore, the system can detect that the result flag in the entry indicates a collision, generate a new lookup key, and perform a lookup in a separate table using the new lookup key. The result returned from the chained hash lookups, referred to as the "longest prefix match lookup," is used to forward the packet. In this disclosure, longest prefix match lookup refers to performing a lookup that returns a result matching the largest number of components, from the most general level to the most specific level, in an HSVLI. Thus, by mapping the name components in a size-based manner to the forwarding hash table (e.g., the hardware-assisted hash table maintained by a CCN router), and by chaining the hash lookups with unique index keys, the system can use hardware-assisted hash tables in a CCN router to increase the efficiency of forwarding packets.

In examples described in this disclosure, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms are used to describe the CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. An example of a CCN architecture is described in U.S. patent application Ser. No. 12/338,175.

Network Architecture and Overview of Forwarding Using Hardware-Assisted Hash Tables FIG. 1 illustrates an exemplary computing environment 100 that facilitates forwarding of packets with variable length names based on hardware-assisted hash tables, in accordance with an embodiment of the present invention. Computing environment 100 can include a device 132, which can include any content consuming device that can determine a request for content via network 130. Computing environment 100 can also include a device 134, which can include any content consuming device that can determine a request for content via network 130. Computing environment 100 can include a network 130, which can include nodes 102, 104, 106, 108, 110, 112, and 114. Network 130 can be a content centric network (CCN), and each of nodes 102-114 can be a CCN forwarder or router that contains a network processor with the hardware-assisted hash tables described in this disclosure. A user of device 132 can generate an interest packet 140 with an HSVLI 142 of "/shortname1/longname/shortname2" for a piece of content, which is received by a content producer at device 134. Device 134 can return a content object 144 fulfilling interest 140, along a reverse path as interest 140. Interest 140 and content object 144 may pass through various intermediate routers in network 130, including a CCN router at node 102 ("CCN router 102"). CCN router 102 maintains a forwarding hash table 150 which uses specific hardware included in the processor of router 102.

Forwarding hash table 150 can include forwarding information for HSVLI 142 of "shortname1/longname/shortname2" by listing entries with a hash key 160 and a result 170. Forwarding hash table 150 can contain entries 152, 154, and 156. For short name components (e.g., less than or equal to 41 bytes), CCN router 102 can use the name component directly in the hash key, as in entry 152 with a value of "shortname1," and in entry 156 with a value of "shortname2." For long name components (e.g., greater than 41 bytes), CCN router 102 can first compress the name component by performing a compression function on the name component to obtain a compressed key, $K_c$, and use that compressed key $K_c$ in the hash key, as in entry 154 with a value of "hash(longname)." The compression function can be based on a hash function, a dictionary method, or any other known method. Entry 154 can also include a string identifier (SID) field that indicates the index to an entry in separate string table that stores the original, uncompressed "longname" string. CCN router 102 detects and handles insertion and lookup collisions as described in relation to FIGS. 2, 3A, and 3B. In some embodiments, forwarding hash table 150 includes one table for short name components (e.g., entries 152 and 156) that does not include an SID and another table for long name components (e.g., entry 154) that does include an SID. Compressed and uncompressed keys can be stored in different tables, e.g., corresponding to the data structures shown in FIGS. 4A-4C for uncompressed keys and FIG. 4D for compressed keys. Entries in forwarding hash table 150 can also include a bit in the key to indicate whether the key is compressed or uncompressed.

Furthermore, CCN router 102 forwards packet 140 by performing chained hash lookups in forwarding hash table 150 to determine the longest prefix match for HSVLI 142. CCN router 102 computes the key for the first name component ("shortname1"). Because the first name component is no longer than a threshold, it uses an uncompressed key $K_1$ equal to a PEID concatenated with the literal name component (e.g., hash key 160 of entry 152). The system looks up $K_1$ in the uncompressed key hash table. The hardware-assisted hash table will then produce the corresponding result. If a match is found based on $K_1$, the results will contain an EID and corresponding forwarding information for the name (e.g., result 170 of entry 152). The system then proceeds to look up the next name component ("long-name"). Because this name component is longer than a threshold, it computes a compressed key $K_2$ equal to a PEID concatenated with a hash of the name component (e.g., hash key 160 of entry 154). In this case, the PEID is the EID returned from $K_1$. The system looks up $K_2$ in the compressed key hash table. The hardware-assisted hash table will then produce the corresponding result. If a match is found based on $K_2$, the results will contain an EID and corresponding forwarding information for the name (e.g., result 170 of entry 154). The EID can be a small number, efficiently and uniquely compressing the previous key. The system continues these chained hash lookups for each subsequent name component, and the result returned from the most specific level name component ("shortname2") is the longest prefix match (e.g., forwarding information of result 170 for entry 156).

Inserting Entries Using Hardware-Assisted Hash Table

Figure 2:
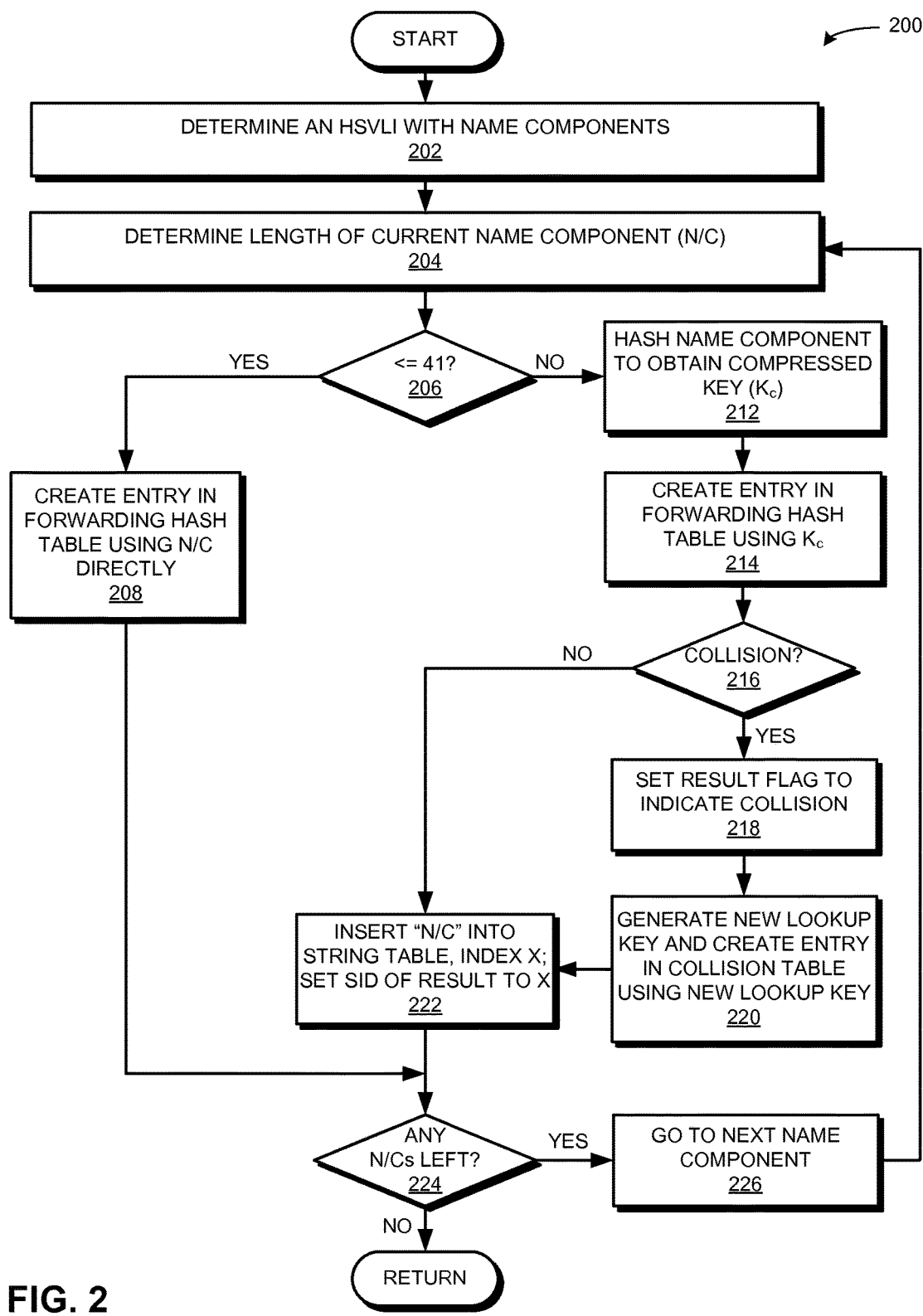
FIG. 2 presents a flow chart illustrating a method for inserting entries into a forwarding table based on a hardware-assisted hash table, in accordance with an embodiment of the present invention.

FIG. 2 presents a flow chart illustrating a method 200 for inserting entries into a forwarding table based on a hardware-assisted hash table, in accordance with an embodiment of the present invention. During operation, the system determines a packet with an HSVLI (operation 202). The system parses through the HSVLI in order (e.g., by each name component from the most general level to the most specific level). The system determines the length of the current name component (operation 204). If the length is less than or equal to a predetermined size (e.g., 41 bytes) (decision 206), the system creates an entry in the hash table using the name component directly (e.g., the original, uncompressed string) (operation 208). The key for the entry can be the Parent Entry Identifier (PEID) concatenated with the hash of the name component, while the result for the entry can include the unique Entry Identifier (EID) assigned by the control plane. For each name component, the PEID is set to an initial value of "0" and is updated during the lookup process such that the PEID is set to the EID of the lookup from the previous name component, as described below in relation to FIG. 3A. The system then determines if any name components remain to be processed (decision 224). If there are no name components left, the operation returns. If more name components remain to be processed, the system moves to the next name component (operation 226), and returns to operation 204 to begin the insertion process for the next name component.

If the length is less than or equal to a predetermined size (e.g., 41 bytes) (decision 206), the system compresses the name component by, e.g., hashing the name component, to obtain a compressed key ($K_c$) (operation 212). The system creates an entry in the hash table using the compressed key, $K_c$ (operation 214). If the system does not detect a collision upon inserting the entry based on the compressed key (decision 216), the system inserts the original, uncompressed string into a string table at a specific index, and includes a string identifier (SID) in the result of the entry in the forwarding table with a value set to the specific index value (operation 222). The SID is a pointer to a table storing the uncompressed key value. If the system does detect a collision upon inserting the entry based on the compressed key (decision 216), the system sets a result flag in the entry to indicate a collision (operation 218). The system then generates a new lookup key and creates an entry in a collision table using the new lookup key (operation 220). The system performs operation 222, as described above. Subsequently, the system determines whether any name components remain to be processed (decision 224), and if any name components do remain to be processed, moves to the next name component (operation 226) to begin the insertion process for the next name component (operation 204).

Looking Up Entries Using Hardware-Assisted Hash Table

Figure 3A:
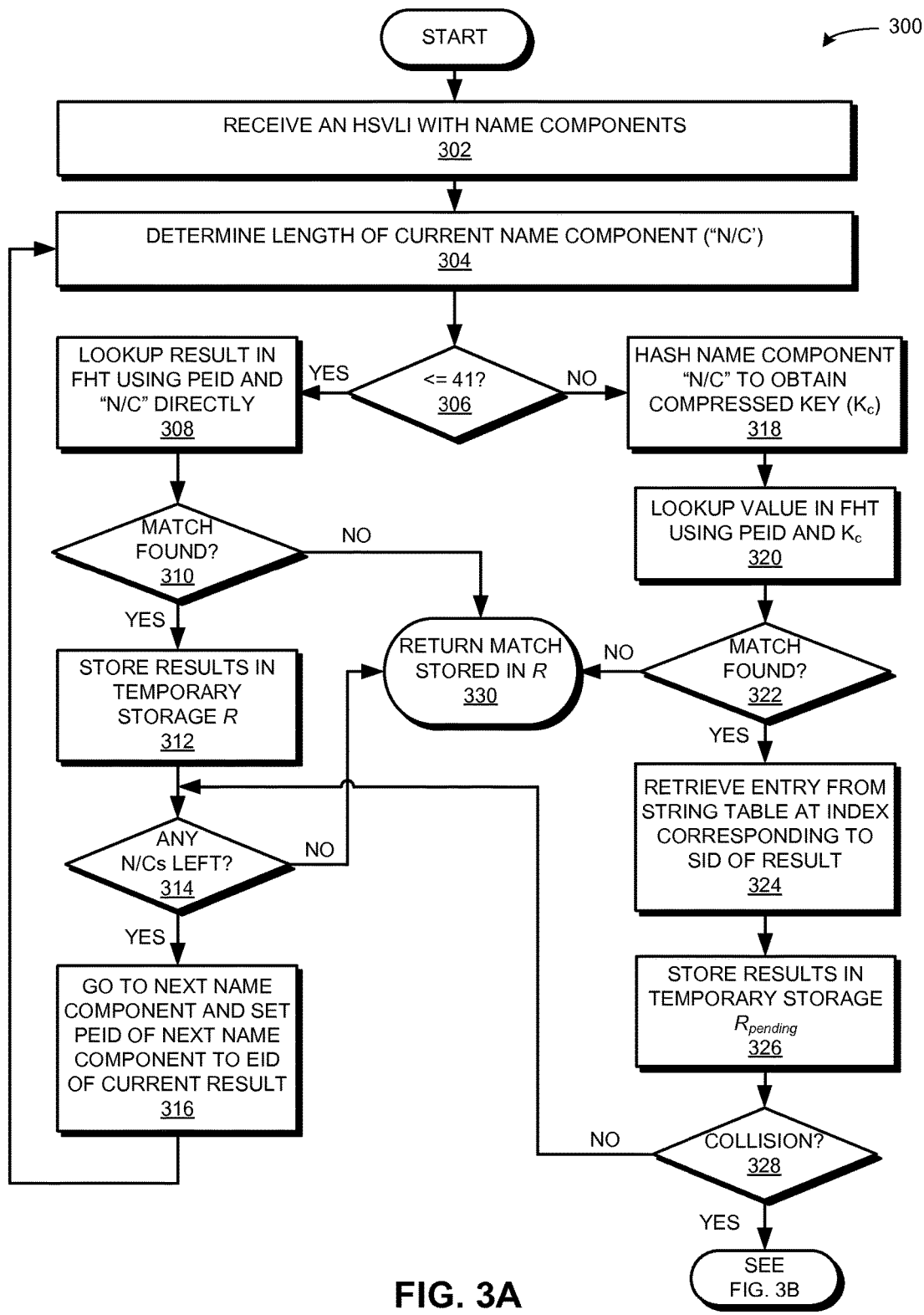
FIG. 3A presents a flow chart illustrating a method for looking up entries in a forwarding table based on a hardware-assisted hash table, in accordance with an embodiment of the present invention.

FIG. 3A presents a flow chart illustrating a method 300 for looking up entries in a forwarding table based on a hardware-assisted hash table, in accordance with an embodiment of the present invention. During operation, the system receives a packet with an HSVLI (operation 302). The system parses through the HSVLI in order (e.g., by processing each name component from the most general level to the most specific level), obtaining lookup entry results for each name component, and storing each matched result. The matched result for the most specific level name component is the longest prefix match and contains forwarding information for the packet. The longest match, in terms of the number of name components, is considered the best because it is the most specific. The system determines the length of the current name component (operation 304). If the length is less than or equal to a predetermined size (e.g., 41 bytes) (decision 306), the system looks up the value in the forwarding table using a key based on the PEID and the name component directly as a string (operation 308). If a match is not found, the system returns the match that is currently stored in temporary storage R (operation 330). If a match is found, the system stores the matched result in temporary storage R (operation 312). The matched result contains the unique EID that is used to chain the hash table lookups, as described above. The system determines if any name components remain to be processed (decision 314). If there are no name components left, the system returns the match that is currently stored in temporary storage R (operation 330). If more name components remain to be processed (decision 314), the system goes to the next name component and sets the PEID of the next name component to the EID of the current result (operation 316). Subsequently, the system returns to operation 304 to begin the lookup process for the next name component.

If the length is greater than a predetermined size (e.g., 41 bytes) (decision 306), the system compresses the name component by, e.g., hashing the name component, to obtain a compressed key ($K_c$) (operation 318). The system looks up the value in the forwarding table using a key based on the PEID and the compressed key, $K_c$ (operation 320). If a match is not found, the system returns the match that is currently stored in temporary storage R (operation 330). If a match is found, the system determines a string identifier (e.g., index value) for the result and retrieves the entry from the string table corresponding to the index value of the string identifier (SID) (operation 324). As described above, the SID is a pointer to a table storing the uncompressed key value. The system stores the matched result in temporary storage R (operation 326). The matched result contains the unique EID that is used to chain the hash table lookups, as described above. The system determines if a collision is detected in the lookup based on the compressed key (decision 328). If a collision is detected in the lookup based on the compressed key, the operation continues as described in FIG. 3B. If no collision is detected, the system determines if any name components remain to be processed (decision 314). If there are no name components left, the system returns the match that is currently stored in temporary storage R (operation 330). If more name components remain to be processed, the system goes to the next name component and sets the PEID of the next name component to the EID of the current result (operation 316). Subsequently, the system returns to operation 304 to begin the lookup process for the next name component.

Resolving Collisions Using Hardware-Assisted Hash Table

Figure 3B:
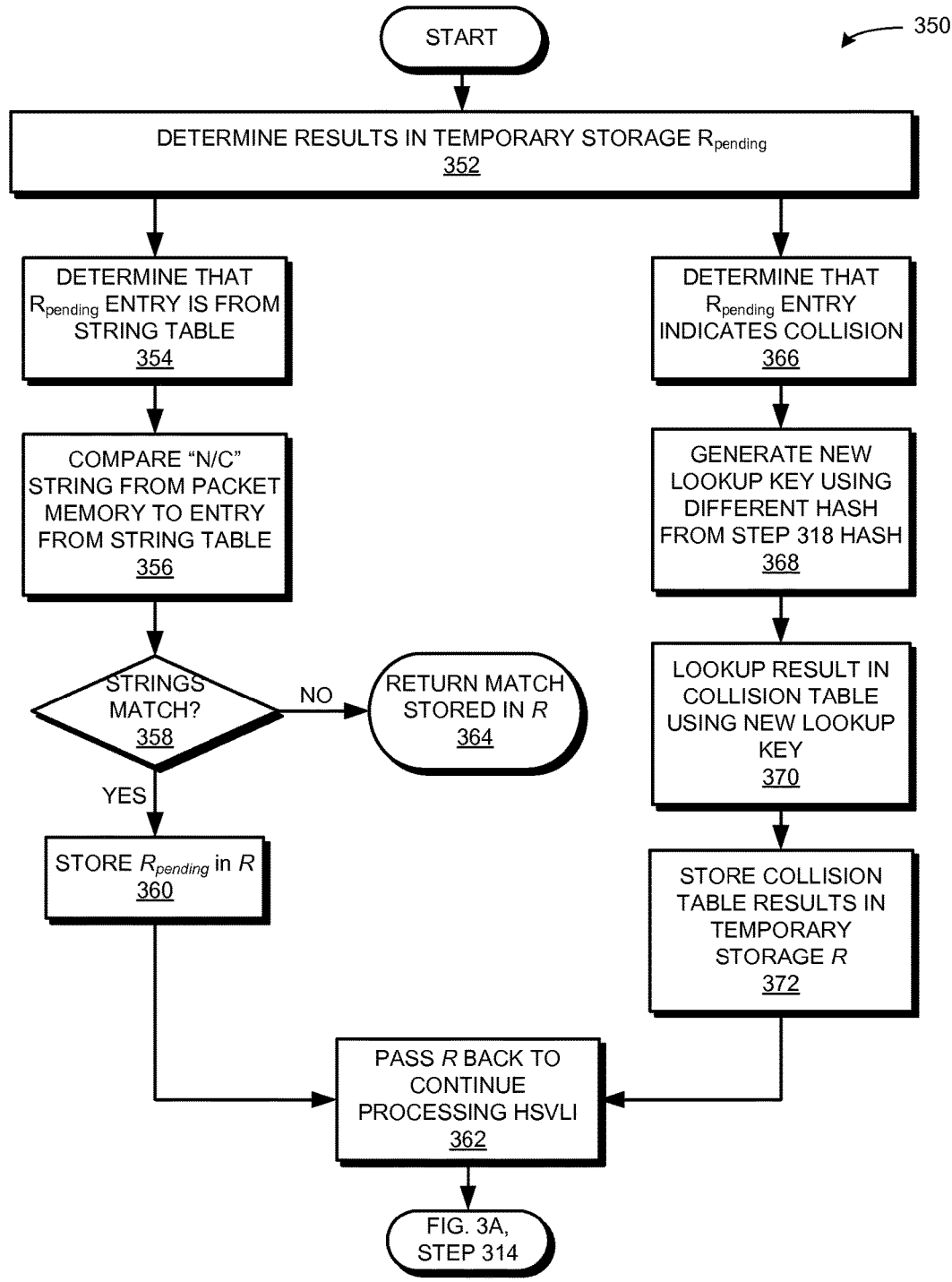
FIG. 3B presents a flow chart illustrating a method for resolving lookup collisions encountered in a forwarding table based on a hardware-assisted hash table, in accordance with an embodiment of the present invention.

FIG. 3B presents a flow chart illustrating a method 350 for resolving lookup collisions encountered in a forwarding table based on a hardware-assisted hash table, in accordance with an embodiment of the present invention. During operation, the system determines temporary storage results $R_{pending}$ (operation 352), which contain the most recent lookup entry from the process depicted and described in relation to FIG. 3A. The system can determine that the entry originates from a string table (operation 354). The system compares the name component string from the packet memory of the interest to the entry from the string table (operation 356). As discussed above, the string table entry is located based on the SID included in the result, where the SID is a pointer to a table storing the uncompressed key value. If the strings do not match (indicating that the hash entries do not match) (decision 358), the system returns the match stored in R (which contains the forwarding information for the previous name component as determined by the operations in FIG. 3A). If the strings do match (decision 358), the system stores the results from $R_{pending}$ in R (operation 360), and passes R back to continue processing the HSVLI (operation 362), which continues in operation 314 of FIG. 3A.

The system can also determine that the entry in $R_{pending}$ indicates a collision, based on a flag in the result indicating a collision (operation 366). The system generates a new lookup key (operation 368) by applying a hash function that is both different from the hash function applied to obtain the compressed key (of operation 318 in FIG. 3A) and the same as the hash function applied to generate the new lookup key upon insertion (as in operation 220 of FIG. 2). The system looks up the result in the collision table using the new lookup key (operation 370) and stores the collision table results in temporary storage R (operation 376). Subsequently, the system passes R back to operation 314 of FIG. 3A to continue processing the HSVLI (operation 362).

Exemplary Formats of Hardware-Assisted Hash Tables

Figure 4A:
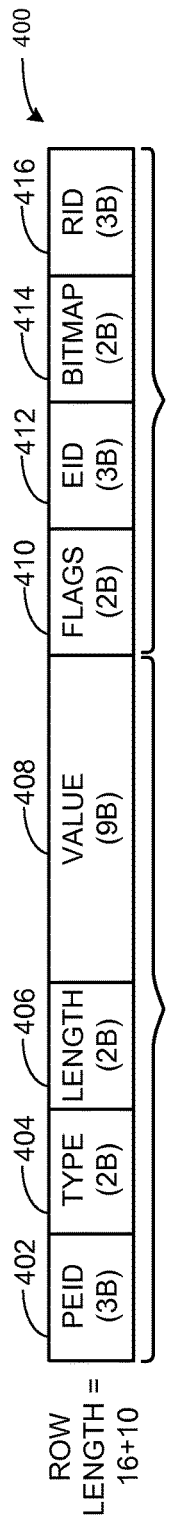
FIG. 4A presents a table depicting a format of a hash table data structure with keys that include a value with a size up to 9 bytes, in accordance with an embodiment of the present invention.

FIG. 4A presents a table depicting a format of a hash table data structure 400 with keys that include a value with a size up to 9 bytes, in accordance with an embodiment of the present invention. Data structure 400 represents an entry in the forwarding hash table and includes a hash key 420 and a result 422 for the entry. Hash key 420 can include a 3-byte Parent Entry Identifier (PEID) field 402, a 2-byte type field 404, a 2-byte length field 406, and a 9-byte value field 408. PEID 402 contains an identifier which is set to an initial value (e.g., 0) and is subsequently updated with a unique entry identifier from a parent name component during a lookup. Result 422 can include a 2-byte flags field 410, a 3-byte entry identifier (EID) field 412, and the forwarding entry which can include a 2-byte slot bitmap field 414 and a 3-byte route identifier (RID) field 416. Flags 410 can include a set of flags specific to the network processor (e.g., the EZChip NP4 Network Processor, herein after "NP4") and can indicate a collision in the forwarding hash table.

EID 412 is a unique identifier assigned by the control plane. During operation, the system can chain lookups in the forwarding hash table by updating the PEID of a lookup after the initial lookup with the value of the EID from the previous lookup, as described in relation to FIGS. 2 and 3A. The forwarding entry (slot bitmap 414 and RID 416) allow multicast forwarding for an interest. For example, slot bitmap 414 can indicate the egress NP4 identity. Each line card can have two NP4 network processors. As a result, slot bitmap 414 indicates the egress NP4 rather than the line card. RID 416 is a unique identifier created by the control software to indicate the egress ports on each line card. The control software can create an array entry on each egress NP4 that is indexed by the RID and indicates the exact ports through which to send the interest. In some embodiments, multiple routes can share the same egress set and use the same RID, while in other embodiments, one RID is assigned for each route. Data structure 400 has a row length of 26, which includes 16 bytes for hash key 420 and 10 bytes for result 422.

Figure 4B:
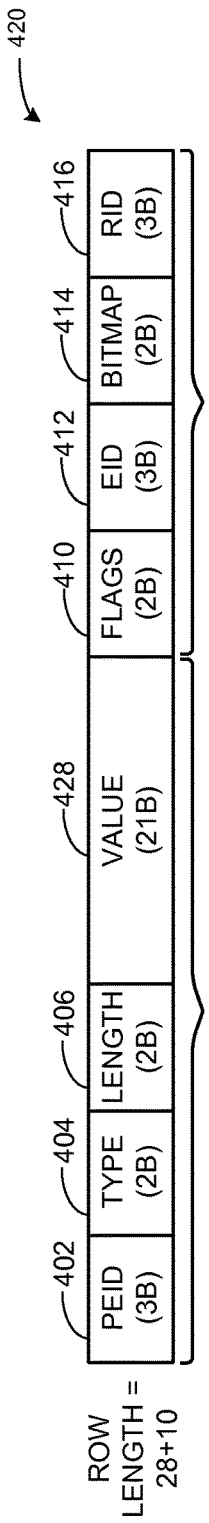
FIG. 4B presents a table depicting a format of a hash table data structure with keys that include a value with a size up to 21 bytes, in accordance with an embodiment of the present invention.

FIG. 4B presents a table depicting a format of a hash table data structure 420 with keys that include a value with a size up to 21 bytes, in accordance with an embodiment of the present invention. Data structure 420 represents an entry in the forwarding hash table and includes a hash key 430 and a result 432 for the entry. Data structure 420 contains fields similar to data structure 400 (e.g., hash key 430 includes PEID 402, type 404, length 408, and a value field 428; and result 432 includes flags 410, EID 412, bitmap 414, and RID 416). The entry represented by data structure 420 contains the value 428 field for, e.g., a string with a length between 10 and 21 bytes. Data structure 420 has a row length of 38 bytes, which includes 28 bytes for hash key 430 and 10 bytes for result 432.

Figure 4C:
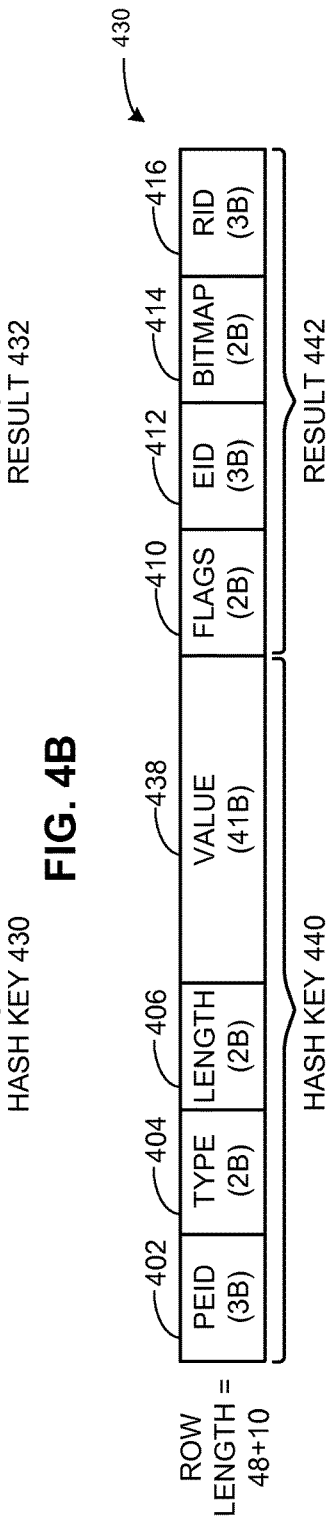
FIG. 4C presents a table depicting a format of a hash table data structure with keys that include a value with a size up to 41 bytes, in accordance with an embodiment of the present invention.

FIG. 4C presents a table depicting a format of a hash table data structure 430 with keys that include a value with a size up to 41 bytes, in accordance with an embodiment of the present invention. Data structure 430 includes fields similar to data structure 400 (e.g., hash key 440 includes PEID 402, type 404, length 408, and a value field 438; and result 432 includes flags 410, EID 412, bitmap 414, and RID 416). The entry represented by data structure 430 contains value 428 for, e.g., a string with a length between 22 and 41 bytes. Data structure 430 has a row length of 58 bytes, which includes 48 bytes for hash key 440 and 10 bytes for result 442.

Figure 4D:
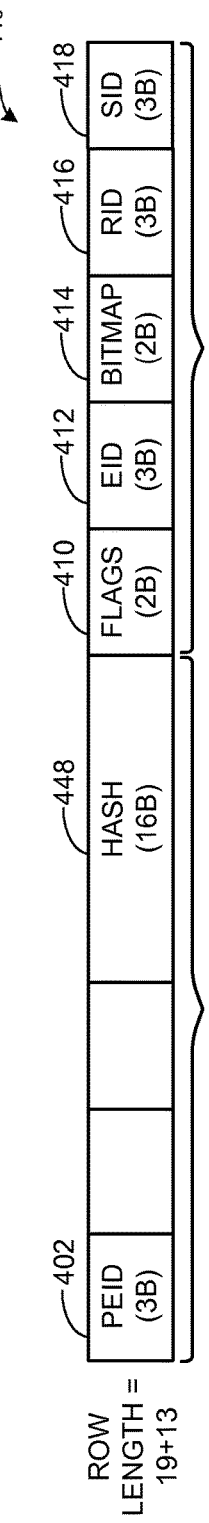
FIG. 4D presents a table depicting a format of a hash table data structure with keys that include a hash value for a string with a size greater than 41 bytes, in accordance with an embodiment of the present invention.

FIG. 4D presents a table depicting a format of a hash table data structure with keys that include a hash value for a string with a size greater than 41 bytes, in accordance with an embodiment of the present invention. Data structure 430 includes a hash key 450 and a result 452. Hash key 450 includes PEID 402 and a 16-byte hash value 448, which contains the compressed key as described above in relation to FIGS. 2 and 3A. Result 452 includes fields similar to data structure 400 (e.g., flags 410, EID 412, bitmap 414, and RID 416) and further includes a string identifier (SID) field 418 which contains a pointer to a table that stores the value of the uncompressed key. In some embodiments, the SID is a collision identifier (CID) indicated by a bit in flags 410. Data structure 440 has a row length of 32, which includes 19 bytes for hash key 450 and 13 bytes for result 452.

In some embodiments (e.g., the NP4), entries in a hardware-assisted hash table are limited to: 36 bytes per entry, where the key and result together are less than or equal to 32 bytes; and 68 bytes per entry, where the key and result together are less than or equal to 64 bytes. Data structures 400, 420, 430, and 440 meet these limits. Data structure 400 represents an entry in the forwarding hash table where the value of the key (e.g., name component) is 9 bytes, and data structures 420 and 430 represent entries with values for larger strings (21 and 41 bytes, respectively). Data structure 440 represents an entry with a key of a length longer than 41 bytes, where the network processor uses a compressor or hash function to obtain a compressed key (hash 448) of 16 bytes in length. Thus, data structures 400 and 440 (26 and 32 bytes, respectively) will both fit in 32 bytes, while data structures 420 and 430 (38 and 58 bytes, respectively) will result in 64-byte entries. Note that because data structure 420 results in the same amount of memory and the same number of cycles as the larger entry of data structure 430, in some embodiments, the system may not use data structure 420. In addition, the data structures for uncompressed keys (e.g., data structures 400, 420, and 430) can include length-encoded name components. For example, data structure 400 has a TLV that includes type field 404, length field 406, and value field 408. Hence, when a literal name component is used as part of the key (e.g., "PEID+name component" in an uncompressed key), the system can accurately determine the value because the remainder of the 41 bytes will be zero padded.

Exemplary Forwarding Hash Table and Corresponding Use Case

Figure 5:
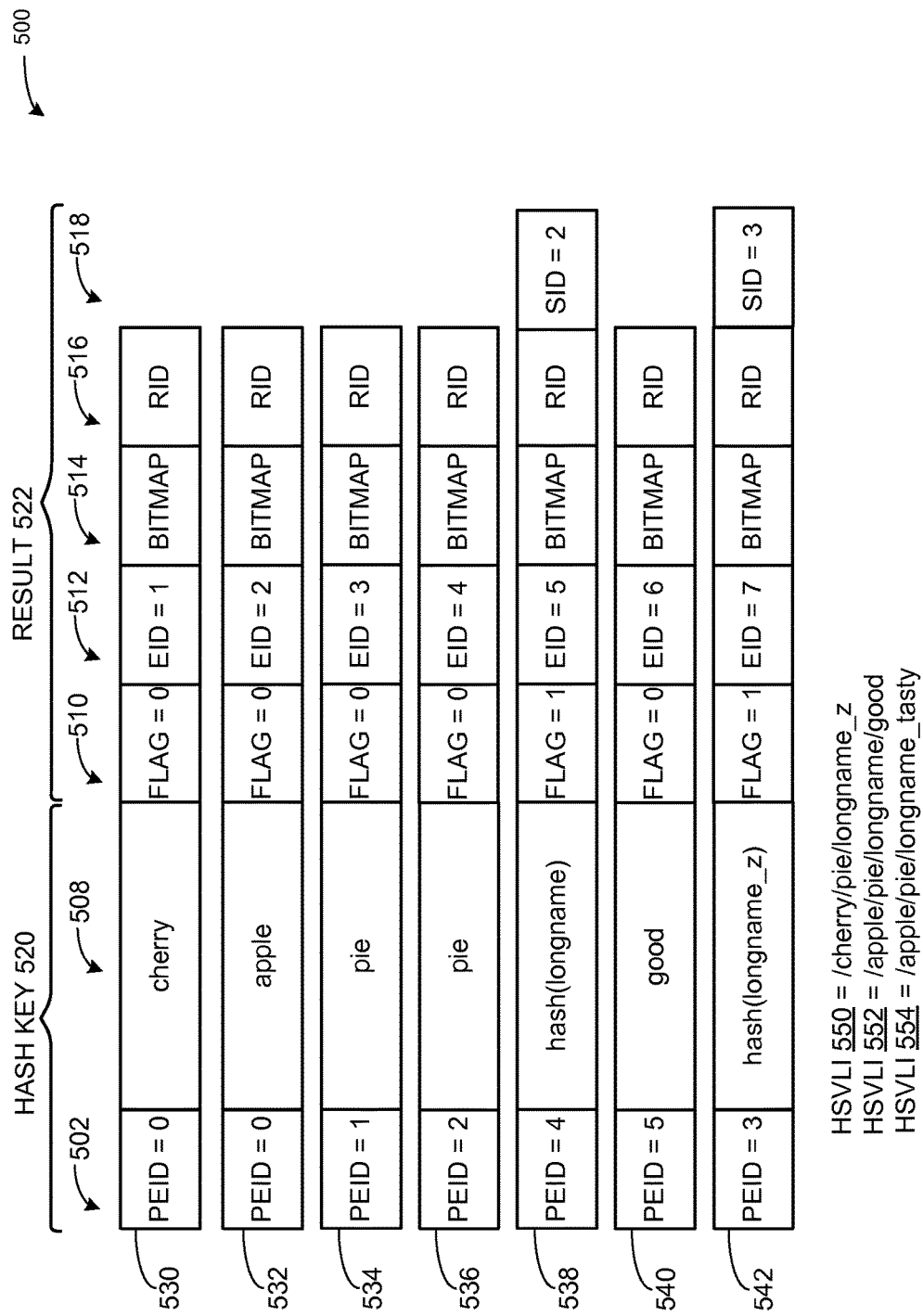
FIG. 5 presents a table depicting an exemplary forwarding hash table, in accordance with an embodiment of the present invention.

FIG. 5 presents a table depicting an exemplary forwarding hash table 500, in accordance with an embodiment of the present invention. Forwarding hash table 500 includes entries 530, 532, 534, 536, and 540 that correspond to data structure 400 (e.g., a key for a string of a length less than or equal to 41 bytes). Forwarding hash table 500 also includes entries 538 and 542 that correspond to data structure 440 (e.g., a compressed key for a string of a length greater than 41 bytes). Each entry in forwarding hash table 500 includes a hash key 520 and a result 522. Hash key 520 includes a PEID 502 and a value 508, and result 522 includes a flag 510, an EID 512, a slot bitmap 514, an RID 516, and (for some entries) an SID 518.

Figure 6:
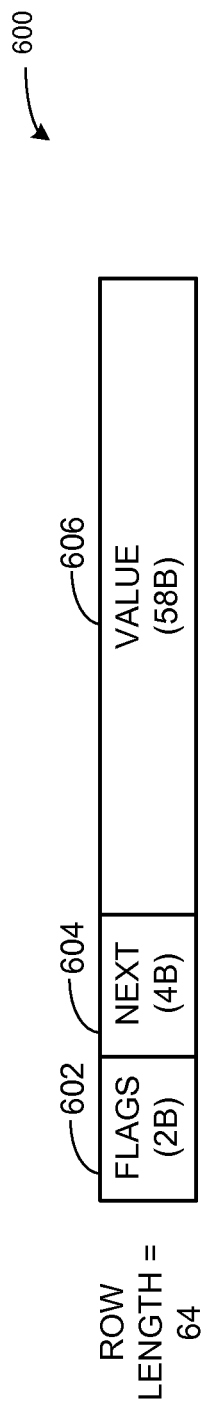
FIG. 6 presents a table depicting a format of a string table, in accordance with an embodiment of the present invention.
Figure 7:
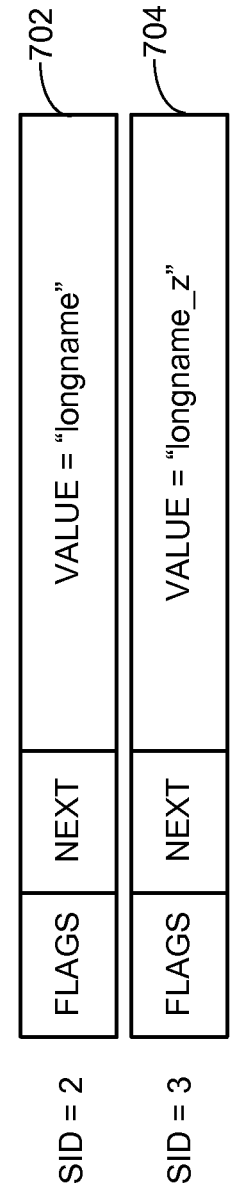
FIG. 7 presents a table depicting an exemplary string table, in accordance with an embodiment of the present invention.

FIG. 6 presents a table depicting a format of a string table 600, in accordance with an embodiment of the present invention. String table 600 can include a 2-byte flags field 602, a 4-byte next field 604, and a 58-byte value field 606. Flags 602 can be specific to, e.g., the NP4 processor. Next 604 can be a pointer for a string that takes multiple entries. If a string requires multiple entries, flags 602 can indicate the table in which to perform the next lookup. For example, storing a 64-byte string can use two string table entries. Value 606 can be a length-encoded string. FIG. 7 presents a table depicting an exemplary string table 700, in accordance with an embodiment of the present invention. String table 700 can include an entry 702 with an SID of "2" and a value of "longname" and an entry 704 with an SID of "3" and a value of "longname_z."

The following use case for HSVLI 552 is based on the exemplary tables presented and described in relation to FIGS. 4A-D, 5, 6, and 7, and the methods disclosed herein. During operation, a CCN forwarder or router can receive an interest with an HSVLI 552 of "/apple/pie/longname/good." The system finds the longest prefix match by looking up a first forwarding entry based on a hash key with a PEID of "0" concatenated with the short (e.g., less than or equal to 41 bytes) string "apple" of the most general level name component. The forwarding hash table returns a result with an EID of "2" (entry 532), which the system then uses as the PEID to lookup the next forwarding entry. The system looks up the next forwarding entry based on a hash key with a PEID of "2" concatenated with the short string "pie" of the next most general level name component, which returns a result with an EID of "4" (entry 536). Next, the system looks up the next forwarding entry based on a hash key with a PEID of "4" concatenated with the hash value of the long (e.g., greater than 41 bytes) string "longname," which returns a result with a collision flag set to "1" that indicates a collision, as well as an SID with a value of "2" (entry 538). The system can determine that the collision is due to two hash keys resulting in the same forwarding entry (e.g., hashing to the same bucket). The system can perform a new hash function on the uncompressed key to obtain a new hash key, use that new hash key to obtain the forwarding entry result in a separate collision table, and return that value to as the result for entry 538. In another example, a lookup on an HSVLI 550 of "/cherry/pie/longname_z" would result in a chained hash lookup (based on PEIDs chained to previous EIDs) resulting in entry 530, entry 534, and entry 542. Upon determining that a collision flag in entry 542 is set to "1" (indicating that the hash of the name component "longname_z" from HSVLI 550 is the same as the hash of the name component "longname" from HSVLI 552), the system performs the new hash function as described above to obtain a new hash key and uses the new hash key to obtain the appropriate forwarding entry result from the separate collision table.

Additionally, the system can determine that the collision occurs because a name component of the HSVLI does not exist in the forwarding hash table, but its hash collides with an existing entry. The system can use the SID of entry 538 to obtain the uncompressed key stored in a separate string table, compare the obtained string with the name component of the HSVLI in the packet memory, and proceed accordingly. As discussed above, this comparison can yield a Boolean result which indicates whether or not the string from the packet memory exists in the string table (and hence is the correct entry in the forwarding hash table). For example, a lookup on an HSVLI 554 of "/apple/pie/longname_tasty" yields a chained hash lookup resulting in entry 532 and entry 536. If the hash of the long string "longname_tasty" of HSVLI 554 results in the same value as the hash of the name component "longname" of HSVLI 552, but the forwarding hash table does not contain an entry for "longname_tasty," this collision cannot be detected during the insertion process. In this case, the next lookup yields entry 538 and the system determines correctness by retrieving the string indicated by SID=2 in result 538 and performing a string comparison between the retrieved string (e.g., "longname") and the string of the name component from HSVLI 554 from the packet memory (e.g., "longname_tasty"). The system determines that the two strings are not equal, indicating that even if entry 538 is returned as a match, it is an incorrect match. Subsequently, the system can return the previous match forwarding entry as the longest prefix match for HSVLI 554 (e.g., entry 536).

Returning to HSVLI 552, the system determines after the collision resolution and correctness checks that entry 538 contains the result for the correct forwarding entry (based on a hash key of "4" concatenated with the hash value of the string "longname"). Entry 538 contains an EID of "5," which the system uses as the PEID for the next lookup, which has a hash key with a PEID of "5" concatenated with the short string "good." This lookup yields a result with an EID of "6", a slot bitmap, and an RID. Because there are no further name components to be processed in HSVLI 552, the forwarding entry for entry 540 contains the longest prefix match and is used by the CCN router to forward the packet.

Exemplary Computer and Communication System

Figure 8:
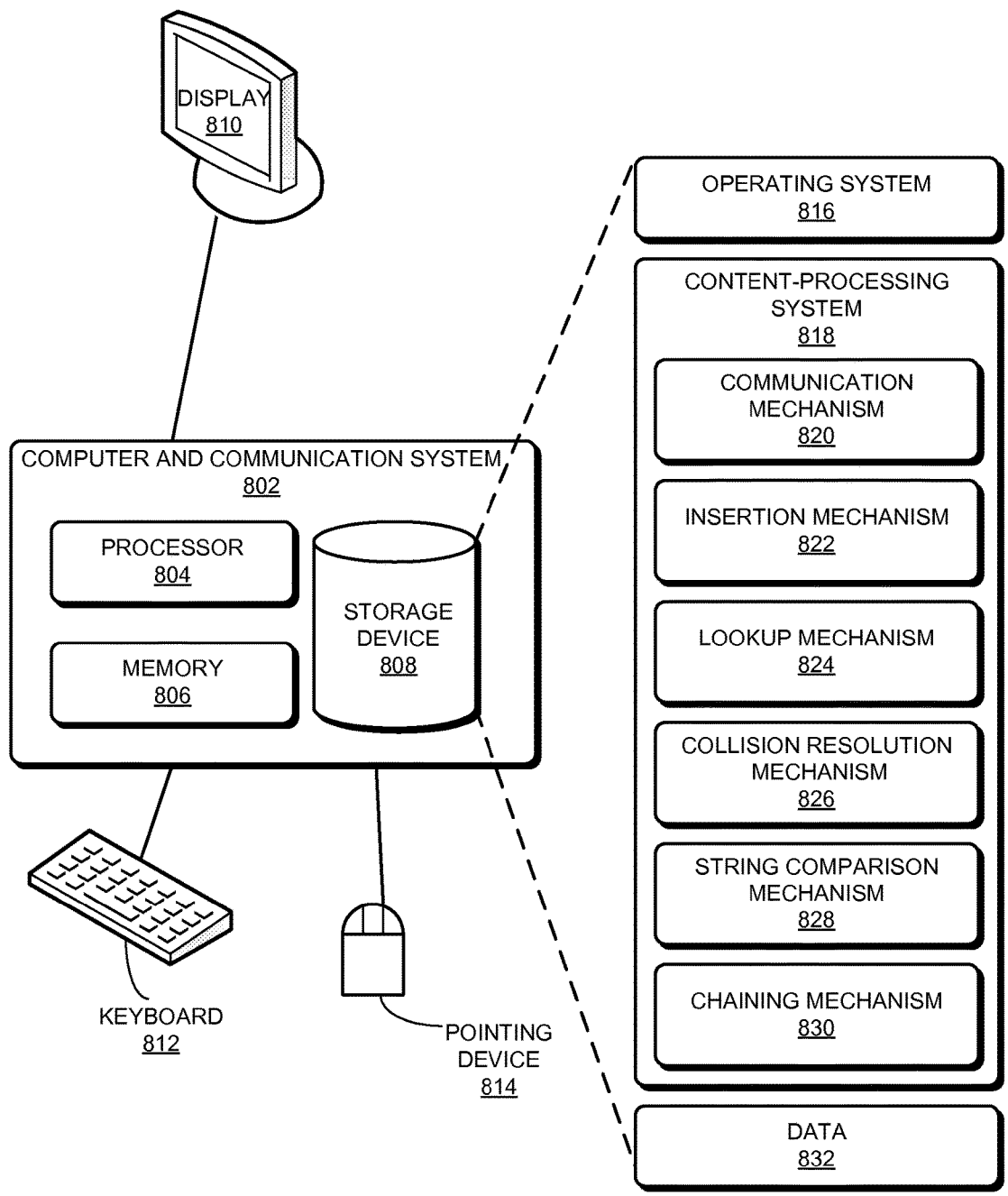
FIG. 8 illustrates an exemplary computer and communication system that facilitates forwarding of packets with variable length names based on hardware-assisted hash tables, in accordance with an embodiment of the present invention In the figures, like reference numerals refer to the same figure elements.

FIG. 8 illustrates an exemplary computer and communication system 802 that facilitates forwarding of packets with variable length names based on hardware-assisted hash tables, in accordance with an embodiment of the present invention. Computer and communication system 802 includes a processor 804, a memory 806, and a storage device 808. Memory 806 can include a volatile memory (e.g., RAM) that serves as a managed memory, and can be used to store one or more memory pools. Furthermore, computer and communication system 802 can be coupled to a display device 810, a keyboard 812, and a pointing device 814. Storage device 808 can store an operating system 816, a content-processing system 818, and data 832.

Content-processing system 818 can include instructions, which when executed by computer and communication system 802, can cause computer and communication system 802 to perform methods and/or processes described in this disclosure. Specifically, content-processing system 818 may include instructions for sending or receiving a packet with an HSVLI over a computer network (communication mechanism 820). Content-processing system 818 can also include instructions for performing a longest prefix match lookup in a forwarding hash table (lookup mechanism 824). Content-processing system 818 can include instructions for inserting entries into a forwarding hash table (insertion mechanism 822). Content-processing system 818 can include instructions for, in response to determining a collision upon an insertion or a lookup in the forwarding hash table, resolving the lookup collision (collision resolution mechanism 826).

Content-processing system 818 can additionally include instructions for comparing an entry in a string table to a name component in packet memory (string comparison mechanism 828). Content-processing system 818 can include instructions for assigning unique entry identifiers to chain one entry to another entry (chaining mechanism 830).

Data 832 can include any data that is required as input or that is generated as output by the methods and/or processes described in this disclosure. Specifically, data 832 can store at least: a packet with an HSVLI; a forwarding hash table, a string table, and a separate collision table as described in this disclosure; and a parent identifier (PEID) and a unique entry identifier (EID) for each entry in the forwarding hash table.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for forwarding packets, comprising:
   receiving, by a computer, a packet with a hierarchically structured variable length identifier (HSVLI) that comprises contiguous name components;
   based on determining that a size of a name component is less than or equal to a predetermined threshold, determining a first forwarding entry based on a parent identifier;
   if the size is greater than the predetermined threshold, compressing the name component using a first compression function to obtain a first compressed key, and determining a second forwarding entry based on the parent identifier and the first compressed key; and
   based on determining that the first compressed key and a second compressed key both return a same forwarding entry, performing a second compression function on the name component to obtain a third compressed key.

2. The method of claim 1, further comprising:
   performing a longest prefix match lookup for forwarding the packet by selecting an entry from a forwarding table of entries that indicate the name component, forwarding information for the name component, and a plurality of entry identifiers that chain a respective entry to another entry.

3. The method of claim 2, wherein the forwarding table is a hash table of entries comprised of a key and a result.

4. The method of claim 3, wherein
   if the size is less than or equal to the predetermined threshold, the key is based on the name component directly; and
   if the size is greater than the predetermined threshold, the key is based on the first compressed key.

5. The method of claim 2, further comprising:
   for each name component, beginning with a name component at a most general level, selecting the entry based on the parent identifier, wherein
   the plurality of entry identifiers includes a parent identifier and an entry identifier, and, for each subsequent name component, the parent identifier of the selected entry corresponds to the entry identifier of an entry corresponding to the name component of a previous most general level.

6. The method of claim 2, further comprising:
   determining a string identifier for the second forwarding entry;
   retrieving a name component from the forwarding table based on the string identifier; and
   comparing the name component of the HSVLI with the name component from the forwarding table.

7. The method of claim 1, further comprising:
selecting an entry in a collision table based on the third compressed key.

8. A non-transitory computer-readable storage medium storing instructions that, when executed by a computer, cause the computer to perform a method for forwarding packets, the method comprising:
receiving a packet with a hierarchically structured variable length identifier (HSVLI) that comprises contiguous name components;
based on determining that a size of a name component is less than or equal to a predetermined threshold, determining a first forwarding entry based on a parent identifier;
if the size is greater than the predetermined threshold, compressing the name component using a first compression function to obtain a first compressed key, and determining a second forwarding entry based on the parent identifier and the first compressed key; and
based on determining that the first compressed key and a second compressed key both return a same forwarding entry, performing a second compression function on the name component to obtain a third compressed key.

9. The medium of claim 8, the method further comprising:
performing a longest prefix match lookup for forwarding the packet by selecting an entry from a forwarding table of entries that indicate the name component, forwarding information for the name component, and a plurality of entry identifiers that chain a respective entry to another entry.

10. The medium of claim 9, wherein the forwarding table is a hash table of entries comprised of a key and a result.

11. The medium of claim 10, wherein
if the size is less than or equal to the predetermined threshold, the key is based on the name component directly; and
if the size is greater than the predetermined threshold, the key is based on the first compressed key.

12. The medium of claim 9, the method further comprising:
for each name component, beginning with a name component at a most general level, selecting the entry based on the parent identifier, wherein
the plurality of entry identifiers includes a parent identifier and an entry identifier, and, for each subsequent name component, the parent identifier of the selected entry corresponds to the entry identifier of an entry corresponding to the name component of a previous most general level.

13. The medium of claim 9, the method further comprising:
determining a string identifier for the second forwarding entry;
retrieving a name component from the forwarding table based on the string identifier; and
comparing the name component of the HSVLI with the name component from the forwarding table.

14. The medium of claim 8, the method further comprising:
selecting an entry in a collision table based on the third compressed key.

15. A computer system for forwarding packets, the system comprising:
a processor; and
a storage device coupled to the processor and storing instructions that, when executed by a computer, cause the computer to perform a method, the method including
receiving a packet with a hierarchically structured variable length identifier (HSVLI) that comprises contiguous name components;
based on determining that a size of a name component is less than or equal to a predetermined threshold, determining a first forwarding entry based on a parent identifier;
if the size is greater than the predetermined threshold, compressing the name component using a first compression function to obtain a first compressed key, and determining a second forwarding entry based on the parent identifier and the first compressed key; and
based on determining that the first compressed key and a second compressed key both return a same forwarding entry, performing a second compression function on the name component to obtain a third compressed key.

16. The system of claim 15, the method further comprising:
performing a longest prefix match lookup for forwarding the packet by selecting an entry from a forwarding table of entries that indicate the name component, forwarding information for the name component, and a plurality of entry identifiers that chain a respective entry to another entry.

17. The system of claim 16, wherein the forwarding table is a hash table of entries comprised of a key and a result.

18. The system of claim 17, wherein
if the size is less than or equal to the predetermined threshold, the key is based on the name component directly; and
if the size is greater than the predetermined threshold, the key is based on the first compressed key.

19. The system of claim 16, the method further comprising:
for each name component, beginning with a name component at a most general level, selecting the entry based on the parent identifier, wherein
the plurality of entry identifiers includes a parent identifier and an entry identifier, and, for each subsequent name component, the parent identifier of the selected entry corresponds to the entry identifier of an entry corresponding to the name component of a previous most general level.

20. The system of claim 16, the method further comprising:
determining a string identifier for the second forwarding entry;
retrieving a name component from the forwarding table based on the string identifier; and
comparing the name component of the HSVLI with the name component from the forwarding table.

* * * * *